United States Patent
Selig et al.

(10) Patent No.: US 10,633,285 B2
(45) Date of Patent: Apr. 28, 2020

(54) ADDITIVE PACK

(71) Applicant: Wacker Chemie AG, Munich (DE)

(72) Inventors: Manfred Selig, Burghausen (DE); Klaus Bonin, Burghausen (DE); Saulat Aijaz Khan, Versova Mumbai (IN); Richard Zhang, Pudong Shanghai (CN)

(73) Assignee: WACKER CHEMIE AG, Munich (DE)

( * ) Notice: Subject to any disclaimer, the term of this patent is extended or adjusted under 35 U.S.C. 154(b) by 46 days.

(21) Appl. No.: 15/754,397

(22) PCT Filed: Aug. 31, 2015

(86) PCT No.: PCT/CN2015/088619
§ 371 (c)(1),
(2) Date: Feb. 22, 2018

(87) PCT Pub. No.: WO2017/035741
PCT Pub. Date: Mar. 9, 2017

(65) Prior Publication Data
US 2018/0257987 A1   Sep. 13, 2018

(51) Int. Cl.
| | |
|---|---|
| *C04B 24/26* | (2006.01) |
| *C04B 28/04* | (2006.01) |
| *C04B 40/00* | (2006.01) |
| *C04B 40/06* | (2006.01) |
| *C08F 218/08* | (2006.01) |
| *C08F 218/12* | (2006.01) |
| *C04B 28/02* | (2006.01) |
| *C08F 218/10* | (2006.01) |
| *C08F 216/06* | (2006.01) |
| *C08L 23/08* | (2006.01) |
| *B65D 65/46* | (2006.01) |
| *E04C 5/07* | (2006.01) |
| *C04B 103/00* | (2006.01) |
| *C04B 103/50* | (2006.01) |
| *C08L 31/04* | (2006.01) |
| *C08L 33/08* | (2006.01) |

(52) U.S. Cl.
CPC .......... *C04B 24/2623* (2013.01); *B65D 65/46* (2013.01); *C04B 28/02* (2013.01); *C04B 28/04* (2013.01); *C04B 40/0042* (2013.01); *C04B 40/065* (2013.01); *C08F 216/06* (2013.01); *C08F 218/08* (2013.01); *C08F 218/10* (2013.01); *C08F 218/12* (2013.01); *C08L 23/08* (2013.01); *E04C 5/076* (2013.01); *C04B 2103/0077* (2013.01); *C04B 2103/50* (2013.01); *C08L 31/04* (2013.01); *C08L 33/08* (2013.01)

(58) Field of Classification Search
CPC ..... C04B 24/2623; C04B 28/02; C04B 28/04; C04B 40/0042; C04B 40/065; B65D 65/46; C08F 216/06; C08F 218/04; C08L 23/08; E04C 5/076
See application file for complete search history.

(56) References Cited

U.S. PATENT DOCUMENTS

| | | | |
|---|---|---|---|
| 4,961,790 | A | 10/1990 | Smith et al. |
| 6,660,079 | B2 | 12/2003 | Jodlbauer et al. |
| 2002/0035192 | A1 | 3/2002 | Weitzel |
| 2004/0097645 | A1 | 5/2004 | Weitzel et al. |
| 2007/0112117 | A1 | 5/2007 | Weitzel |
| 2007/0181459 | A1 | 8/2007 | Lindlbauer |
| 2008/0098933 | A1 | 5/2008 | Killat |
| 2012/0164424 | A1 | 6/2012 | Vicari et al. |

FOREIGN PATENT DOCUMENTS

| | | | |
|---|---|---|---|
| CN | 1966533 | A | 5/2007 |
| EP | 0642985 | * | 3/1995 |
| EP | 0722917 | B1 | 8/1999 |
| EP | 1238958 | B1 | 10/2003 |
| EP | 1916275 | A1 | 4/2008 |
| EP | 2537818 | A2 | 12/2012 |
| EP | 2297060 | B1 | 10/2013 |
| JP | 6345124 | A2 | 12/1994 |
| JP | 3209581 | B2 | 9/2001 |
| WO | 03042126 | A1 | 5/2003 |
| WO | 03106369 | A1 | 12/2003 |
| WO | 2005092724 | A1 | 10/2005 |
| WO | 2011073224 | A2 | 6/2011 |
| WO | 2011098412 | A1 | 8/2011 |
| WO | 2013119537 | A1 | 8/2013 |

OTHER PUBLICATIONS

JP 3209581 B2, English Abstract of (JPH0655529).
JP 6345124 A1, English Abstract.
CN 1966533 A, US 2007/0112117 A1.
EP 0722917 B1, English Patent Abstract.
EP 1238958 B1, US 6660079 B2.
WO 2005/092724 A1, US 2007/0181459 A1.
EP 1916275 A1, US 2008/0098933 A1.
Schulze J., TIZ, No. 9, 1985, English Patent Abstract.
Solublon® kalt-, warm-, heißwasserlösliche PVAL-Folien, p. 6, data sheet No. 304 000 000 1 /501 378, Harke Packaging Products, English Patent Abstract.
Schulze J. in TIZ, vol. 109, No. 9, 1985, 6 pages.
Session J, Fox T. G., Bull. Am. Physics Soc. 1, 3, 1956, p. 123.
Harke Packaging Products, Brochure "Solublon cold-, warm-, and hot-water-soluble PVAL-films", 9 pages.
Water-Soluble Resins, Robert L. Davidson, Marshall Sittig, New York, 1968, Chapter 6, Polyvinyl Alcohol, 25 pages.
Polymer Handbook Second Edition, John Wiley & Sons, New York, 1975, 58 pages.

* cited by examiner

Primary Examiner — Edward J Cain
(74) Attorney, Agent, or Firm — Brooks Kushman P.C.

(57) ABSTRACT

An additive pack which comprises a water-soluble capsule containing a water-dispersible polymer powder (dispersion powder) is used to prepare aqueous construction materials such as cements and mortars on site, while offering set properties equivalent or superior to ready to mix dry mix formulations.

12 Claims, No Drawings

ADDITIVE PACK

CROSS REFERENCE TO RELATED APPLICATIONS

This application is the U.S. National Phase of PCT Appln. No. PCT/CN2015/088619 filed Aug. 31, 2015, the disclosure of which is incorporated in their entirety by reference herein.

BACKGROUND OF THE INVENTION

1. Field of the Invention

The invention relates to an additive pack which comprises a water-soluble capsule and a water-dispersible polymer powder (dispersion powder), to the use of the additive pack in the production of aqueous mortars with mineral binders, and to aqueous mortar compositions obtained with the additive pack.

2. Description of the Related Art

Production of mortar compositions using mineral binders involves mixing mineral binders such as cement, gypsum, lime, or loam together with fillers such as sand, and with other additives such as dispersion powders and/or thickeners, and then mixing these with water to give the mortar compositions. In recent years the materials known as factory-produced dry mortars have been used successfully to produce these mortar compositions. These dry mortars are premixed in accordance with defined formulations at the factory of a producer of construction materials, and provided in packaged form (bagged product) or in bulk form as a silo product. Prior to use, the dry mortars are then simply mixed with a defined quantity of water.

The main constituents of these dry mortars are the mineral binder, such as cement, gypsum or lime, and the filler, for example sand. In order to improve the mechanical properties of the hardened mortar composition it is also possible to add additives such as dispersion powders, optionally thickeners to obtain a desired rheology, and also setting accelerator or setting retarders to obtain desired use properties. Examples of these dry mortars are found in EP 0 722 917 B1, EP 1 238 958 B1, and EP 2 537 818 A2.

Additives for dry mortars are known. By way of example, WO 03/106369 A1 describes an additive for improving flow properties which comprises cellulose ether and polycarboxylic acids. The patent EP 2 297 060 B1 describes a rheology additive made of dispersing agent and stabilizer. WO 2011/073224 A1 describes adhesion improvers which comprise plasticizers. WO 2011/098412 A1 describes a hydrophobizing agent.

The expression "water-dispersible polymer powders" ("dispersion powders") is used for powder compositions which are accessible by means of drying of the corresponding aqueous polymer dispersions in the presence of protective colloids. By virtue of this production process, the fine-particle polymer resin of the dispersion becomes coated with a water-soluble protective colloid. During drying, the protective colloid particles act as a jacket which prevents caking of the polymer particles. On redispersion of the dispersible polymer powders in water, the protective colloid redissolves in water, and an aqueous dispersion of the original polymer particles is again obtained (Schulze J. in TIZ, No. 9, 1985).

The advantage of the dry mortar compositions discussed above is a uniform product quality by virtue of the standardized industrial production process. However, a precondition for supply of these dry mortar formulations to construction sites is a highly developed infrastructure for the transport of the dry mortars to the end user, involving not only silos but also distributors of construction materials or construction-industry markets. To the extent that the dry mortars, dispersion powders, or construction-chemistry additives are in solid form, they are generally marketed in a form packaged in bags or sacks made of paper or of plastics such as polyethylene or PVC. An example of the packaging used for dispersion powders or dry mortars is the multilayer packaging found in WO 2005/092724 A1.

Regions with less developed infrastructure generally have local access to the main materials for a mortar composition, i.e. cement, sand and water, but do not necessarily have access to ready-to-use dry mortar.

It would therefore be desirable to provide additives for improving the properties of mortars, and specifically in a supply form in which these can be combined with the main materials for aqueous mortar compositions, in order to obtain quality of construction materials that is comparable with that of materials produced with use of ready-to-use dry mortars. These additives should also be made available in a form in which they can immediately be used in the quantity required for mortar production, for example by virtue of packaging in a pack of appropriate size. Disadvantages such as dusting during opening of the packaging, and packaging waste, should be avoided here.

SUMMARY OF THE INVENTION

The invention provides an additive pack which comprises a water-soluble capsule and a water-dispersible polymer powder (dispersion powder).

DETAILED DESCRIPTION OF THE PREFERRED EMBODIMENT

Suitable water-soluble capsules are those made of cold-water-soluble and warm-water-soluble polymer films. The expression "cold-water-soluble" polymer films here means that the polymer film dissolves completely in water at a water temperature of 20° C., preferably of 10° C. The expression "warm-water-soluble" polymer films here means that the polymer film dissolves completely in water at a water temperature of 40° C. The dissolution time is generally from 10 to 60 seconds, with stirring, the time being dependent on the temperature of the water, the thickness of the film, and the type of polymer. A test for determining the solubility of polymer films in water is described by way of example on page 6 in the brochure "Solublon® kalt-, warm-, heißwasserlösliche PVAl-Folien" [Solublon® cold-, warm-, and hot-water-soluble PVAl films], data sheet no. 3040000001/501378 from HARKE Packaging Products.

Suitable polymers for the production of cold-water-soluble or warm-water-soluble polymer films are known to the those skilled in the art, for example from Davidson and Sitting, Watersoluble Resins, Van Nostrand-Reinhold Company, New York (1968). Familiar materials are polyvinyl alcohols, cellulose ethers, polyethylene oxides, polyvinylpyrrolidones and polyamides. Suitable polymer films are obtainable commercially.

Preference is given to cold-water-soluble polymer films. Particular preference is given to cold-water-soluble polymer films manufactured from cold-water-soluble vinyl alcohol polymers. Vinyl alcohol polymers suitable for this purpose are partially hydrolyzed vinyl acetate homopolymers or partially hydrolyzed vinyl acetate copolymers, with a degree of hydrolysis of from 70 to 95 mol %, preferably from 80 to 90 mol %, and with a Höppler viscosity of from 1 to 50 mPas, preferably from 5 to 30 mPas, in each case measured by the Höppler method in accordance with DIN 53015 with a falling-ball viscometer in 4% by weight solution in water.

Examples of partially hydrolyzed vinyl acetate copolymers are partially hydrolyzed copolymers of vinyl acetate with from 1 to 50% by weight of one or more comonomers from the group comprising ethylenically unsaturated carboxylic acids such as acrylic acid, methacrylic acid, maleic acid (and maleic anhydride), and itcaonic acid, and ethylenically unsaturated sulfonic acids (and salts thereof) such as 2-acrylamido-2-methylpropanesulfonic acid, and 1-alkylvinyl acetate having $C_1$- to $C_4$-alkyl groups such as isopropenyl acetate (1-methylvinyl acetate). These partially hydrolyzed vinyl acetate copolymers are described by way of example in WO 2013/119537 A1.

Preference is given to partially hydrolyzed vinyl acetate homopolymers with a degree of hydrolysis of from 80 to 90 mol %, and with a Höppler viscosity of from 5 to 30 mPas. Preference is also given to partially hydrolyzed vinyl acetate copolymers obtainable by polymerizing from 80 to 95% by weight of vinyl acetate, from 5 to 20% by weight of isopropenyl acetate, and from 0 to 5% by weight of other ethylenically unsaturated monomers copolymerizable therewith, where the total of the % by weight data is always 100% by weight, respectively with a degree of hydrolysis of from 80 to 90 mol % and a Höppler viscosity of from 5 to 30 mPas. Preference is also given to mixtures of the partially hydrolyzed vinyl acetate homopolymers mentioned as preferred with the partially hydrolyzed vinyl acetate copolymers mentioned as preferred.

The production of partially hydrolyzed vinyl acetate homopolymers and of partially hydrolyzed vinyl acetate copolymers is known to those skilled in the art. In the first stage the vinyl acetate homopolymers or the vinyl acetate copolymers are preferably produced by free-radical solution polymerization of the corresponding monomers in alcoholic solution, for example in methanol or ethanol. Hydrolysis then follows, preferably in a basic medium with addition of NaOH. The resultant polymer can be isolated by filtration or distillation. Films made of partially hydrolyzed vinyl acetate homopolymers or of partially hydrolyzed vinyl acetate copolymers are also obtainable commercially, for example under the trademark Solublon® from Aicello Chemical Co. Ltd.

The partially hydrolyzed vinyl acetate homopolymers or vinyl acetate copolymers can be processed in a known manner by casting or extrusion to give films. The thickness of the films is generally from 10 to 500 µm, preferably from 10 to 100 µm.

The water-soluble capsule in the form of a pouch or bag can then be molded in a known manner from the film. These water-soluble capsules are also obtainable commercially, by way of example, from the company gs-go soluble. In order to reduce surface tack, the exterior surface of the packaging can optionally be dusted with starch powder or with talc powder. Once the material has been charged to the capsule the latter is closed, for example by sealing.

The water-soluble capsule serves in the invention as packaging for water-dispersible polymer powders (dispersion powders), optionally blended with other additives for dry mortars or with construction-chemistry products.

The polymers of the water-dispersible polymer powders (dispersion powders) are polymers of one or more ethylenically unsaturated monomers selected from the group comprising vinyl esters of unbranched or branched carboxylic acids having from 1 to 12 C atoms, acrylic esters or methacrylic esters of unbranched or branched alcohols having from 1 to 15 C atoms, vinyl aromatics, such as styrene, olefins such as ethylene, 1,3-dienes, and vinyl chloride. It is optionally also possible to copolymerize from 0.1 to 10% by weight, based on the total weight of the monomer mixture, of auxiliary monomers. It is preferable to use from 0.5 to 5% by weight of auxiliary monomers. It is most preferable that no auxiliary monomers are copolymerized. Examples of auxiliary monomers are ethylenically unsaturated mono- and dicarboxylic acids; ethylenically unsaturated carboxamides and ethylenically unsaturated carbonitriles; and ethylenically unsaturated sulfonic acids and salts thereof. Other examples are precrosslinking comonomers such as polyethylenically unsaturated comonomers, and postcrosslinking comonomers, for example N-methylolacrylamide (NMA). Other suitable materials are epoxy-functional comonomers such as glycidyl methacrylate and silicon-functional comonomers such as vinyltrimethoxysilane.

Preference is given to homopolymers of vinyl acetate;

copolymers of vinyl acetate and ethylene;

copolymers of vinyl acetate, ethylene, and a vinyl ester of α-branched monocarboxylic acids having from 9 to 12 C atoms; copolymers of vinyl acetate and one or more (meth)acrylic esters of unbranched or branched alcohols having from 1 to 15 C atoms, in particular methyl acrylate, ethyl acrylate, propyl acrylate, n-butyl acrylate, 2-ethylhexyl acrylate, 2-propylheptyl acrylate, and optionally ethylene;

copolymers of vinyl acetate, ethylene, and vinyl chloride, and also optionally other vinyl esters and/or (meth)acrylic esters;

copolymers of one or more (meth)acrylic esters of unbranched or branched alcohols having from 1 to 15 C atoms, for example n-butyl acrylate and 2-ethylhexyl acrylate, and/or methyl methyacrylate;

copolymers of styrene and one or more monomers from the group of methyl acrylate, ethyl acrylate, propyl acrylate, n-butyl acrylate, 2-ethylhexyl acrylate;

copolymers of 1,3-butadiene and styrene and/or methyl methacrylate, and also optionally other acrylic esters;

where the mixtures mentioned can optionally also comprise one or more of the abovementioned auxiliary monomers.

Particular preference is given to copolymers of vinyl acetate and from 1 to 50% by weight of ethylene;

copolymers of vinyl acetate and from 1 to 50% by weight of ethylene and from 1 to 50% by weight of one or more other comonomers from the group of the vinyl esters having from 3 to 12 C atoms in the carboxylic acid moiety, for example vinyl propionate, vinyl laurate, vinyl esters of alpha-branched carboxylic acids having from 9 to 12 C atoms, for example VeoVa9, VeoVa10, VeoVa11 (trademark of Hexion);

copolymers of vinyl acetate, from 1 to 50% by weight of ethylene and preferably from 1 to 60% by weight of (meth)acrylic ester of unbranched or branched alcohols having from 1 to 15 C atoms, in particular n-butyl acrylate, 2-propylheptyl acrylate, or 2-ethylhexyl acrylate;

copolymers of from 30 to 75% by weight of vinyl acetate, from 1 to 30% by weight of vinyl laurate, or vinyl ester of an alpha-branched carboxylic acid having from 9 to 12 C atoms, and also from 1 to 30% by weight of (meth)acrylic ester of unbranched or branched alcohols having from 1 to 15 C atoms, in particular n-butyl acrylate, 2-propylheptyl acrylate, or 2-ethylhexyl acrylate, where these also comprise from 1 to 40% by weight of ethylene;

copolymers of vinyl acetate, from 1 to 50% by weight of ethylene, and from 1 to 60% by weight of vinyl chloride, and also optionally other vinyl esters and/or (meth)acrylic esters;
where the copolymers can respectively also comprise the quantities mentioned of the auxiliary monomers mentioned and the total of the percent by weight data is always 100% by weight.

Particular preference is also given to (meth)acrylic ester polymers such as polymers of n-butyl acrylate or 2-ethylhexyl acrylate, or copolymers of methyl methacrylate with n-butyl acrylate and/or 2-ethylhexyl acrylate; styrene-acrylic ester copolymers with one or more monomers from the group of methyl acrylate, ethyl acrylate, propyl acrylate, n-butyl acrylate, 2-ethylhexyl acrylate; vinyl acetate-acrylic ester copolymers with one or more monomers from the group of methyl acrylate, ethyl acrylate, propyl acrylate, n-butyl acrylate, 2-ethylhexyl acrylate, 2-propylheptyl acrylate, and optionally ethylene; styrene-1,3-butadiene copolymers;
where the polymers can respectively also comprise the quantities mentioned of auxiliary monomers and the total of the percent by weight data is always 100% by weight.

Most preference is given to copolymers of vinyl acetate and from 5 to 50% by weight, in particular from 5 to 25% by weight, of ethylene;
copolymers of vinyl acetate, from 1 to 50% by weight of ethylene, and from 1 to 50% by weight of vinyl ester of α-branched monocarboxylic acids having from 9 to 12 C atoms;
copolymers of from 30 to 75% by weight of vinyl acetate, from 1 to 30% by weight of vinyl laurate or vinyl ester of an alpha-branched carboxylic acid having from 9 to 12 C atoms, and also from 1 to 30% by weight of (meth)acrylic ester of unbranched or branched alcohols having from 1 to 15 C atoms, where these also comprise from 1 to 40% by weight of ethylene;
copolymers of vinyl acetate, from 1 to 25% by weight of ethylene, and from 15 to 35% by weight of vinyl chloride;
copolymers of styrene and from 20 to 50% by weight of 1,3-butadiene;
copolymers of styrene and from 20 to 50% by weight of methyl acrylate, ethyl acrylate, propyl acrylate, butyl acrylate, or 2-ethylhexyl acrylate;
where the polymers can respectively also comprise the quantities mentioned of the auxiliary monomers and the total of the percent by weight data is always 100% by weight.

The method here for selection of the monomers and, respectively, the selection of the proportions by weight of the comonomers is such that the resultant glass transition temperature Tg is preferably from −50° C. to +60° C., more preferably from −30° C. to +40° C. and most preferably from −15° C. to +20° C. The glass transition temperature Tg of the polymers can be determined in a known manner by DSC (Dynamic Scanning calorimetry, DIN EN ISO 11357-1/2). Tg can also be approximated by using the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in Kelvin of the homopolymer of the monomer n. Tg values for homopolymers are listed in Polymer Handbook 2nd Edition, J. Wiley & Sons, New York (1975).

The polymers are generally produced by the emulsion polymerization process, for example in the presence of emulsifiers, or preferably in the presence of protective colloids. The resultant polymer dispersion is converted to the water-dispersible polymer powders by drying, optionally after addition of drying aids, for example by spray drying. A production process for dispersion powders is described by way of example in EP 1916275 A1, the relevant information in which is incorporated herein by reference. The water-dispersible polymer powders are also obtainable commercially, examples being the dispersion powders from Wacker Chemie AG.

The additive pack comprises the water-dispersible polymer powder, or can also comprise a mixture of at least one water-dispersible polymer powder and at least one other pulverulent additive for dry mortar or construction-chemistry products, respectively packaged in the water-soluble capsule. Suitable other additives for dry mortars or construction-chemistry products which can be present in addition to the dispersion powder in the additive pack are one or more additives from the group comprising mineral binders such as cement or gypsum; fillers such as sand, powdered quartz, and/or calcium carbonate; thickeners such as cellulose ethers or starch ethers, phylosilicates, or polycarboxylic acids; setting accelerators such as sucrose; setting retarders such as calcium formate; hydrophobizing agents such as silanes or fatty acid esters;
defoamers.

It is preferable that the quantitative proportions of the additives in the respective mixtures are those in which these additives are present in finished mortar compositions. It is also possible that a dry mortar mix comprising dispersion powder is packaged in the water-soluble capsule. In this case it is then possible to obtain the finished mortar by placing the additive pack into a water-filled container.

If thickeners are admixed as other additives, examples of suitable materials are polysaccharides such as cellulose ethers or starch ethers, phylosilicates, or polycarboxylic acids. Preferred thickeners are cellulose ethers from the group of the alkyl cellulose ethers, hydroxyalkyl cellulose ethers, carboxyalkyl cellulose ethers, and the mixed ethers having at least two different substituents from the group of alkyl, hydroxyalkyl, and carboxyalkyl group having alkyl moieties having respectively from 1 to 10 C atoms. The alkyl groups are preferably methyl, ethyl and/or propyl groups. The hydroxyalkyl groups are preferably hydroxymethyl, hydroxyethyl, and/or hydroxypropyl groups. The Brookfield viscosity of the cellulose ethers is generally from 100 to 100,000 mPas, preferably from 1000 to 75 000 mPas, and particularly preferably from 5000 to 50,000 mPas, measured at 20 rpm on a 2% aqueous solution at 20° C.

Particularly preferred cellulose ethers are methylcellulose (MC), ethylcellulose (EC), methylhydroxyethylcellulose (MHEC), ethylhydroxyethylcellulose (EHEC), methyl ethyl ketone hydroxyethylcellulose (MEHEC), hydroxyethylcellulose (HEC), hydroxypropylcellulose (HPC), methylhydroxypropylcellulose (MHPC), hydroxypropylmethylcellulose (HPMC), hydroxyethylmethylcellulose (HEMC), and carboxymethylcellulose (CMC).

Suitable cellulose ethers are obtainable commercially, examples being Berocoll® from AkzoNobel NV, Walocel® from Wolff Cellulosics GmbH & Co. KG, Methocel or Cellosize® from Dow Chemical Company, Tylose® from SE Tylose GmbH & Co. KG, and Culminal® or Natrosol® from Ashland Inc.

In one preferred embodiment the only material charged to the additive pack is dispersion powder.

In another preferred embodiment the additive pack comprises from 50 to 95% by weight, preferably from 50 to 75% by weight, of one or more water-dispersible polymer powders and from 5 to 50% by weight, preferably from 25 to 50% by weight, of one or more other additives, particularly thickeners, based on the total weight of the additives.

With the additive pack it is possible to obtain high-quality aqueous mortars, by adding the additive pack to readily obtainable starting materials such as cement, sand, and water. In particular for use on small construction sites, and in order to simplify metering, the additive pack can be made available in relatively small portions. It is preferable that the additive pack is made available in portions of from 1 g to 10 kg, particularly in portions of from 1 g to 1 kg, most preferably in portions of from 5 g to 500 g, preferably in the form of a pouch or bag.

The aqueous mortar composition can be produced by, in a first step, dissolving the additive pack in water, and then admixing the other constituents, for example mineral binder and the filler. The quantity added depends on the application for which the aqueous mortar composition is to be used, and on the additive mixture present in the additive pack. It is preferable to produce the aqueous mortar composition by adding a quantity of from 0.1 to 10% by weight, more preferably from 1 to 5% by weight, based in each case on the dry weight of the mineral binder, of an additive pack comprising only dispersion powder or comprising a mixture of dispersion powder with thickener.

Preferred mineral binders which are obtainable in all regions are cement, particularly Portland cement and/or calcium aluminate cement, and/or gypsum, and/or lime, and/or loam, and/or pozzolanic materials such as volcanic slags or blast furnace slags.

Preferred fillers used that are generally available can by way of example be sand, and/or chalk, and/or alumina.

The aqueous mortar composition modified with the additive pack generally comprises from 5 to 80 parts by weight of mineral binder and from 20 to 95 parts by weight of filler, and a quantity of water that achieves the desired consistency of the aqueous mortar composition. The precise constitution of each aqueous mortar composition depends on the application thereof. The aqueous mortar composition can by way of example be formulated as tile adhesive, self-leveling composition, repair mortar, jointing mortar, skimcoat, powder paint, or primer.

A particular advantage of the additive pack with water-soluble capsule is that, particularly when partially hydrolyzed vinyl acetate homo- and copolymers are used, the water-soluble polymer of the capsule markedly improves the dispersion of the solid constituents of the mortar composition, and thus improves the usage properties thereof. The water-soluble polymer of the capsule can also, as a film-forming polymer, increase the mechanical strength of the hardened mortar composition. The partially hydrolyzed copolymers of vinyl acetate with isopropenyl acetate that are mentioned as preferred have particularly advantageous effect because these, unlike the carboxy-functional polymers frequently used as packaging, do not retard setting of the cement.

The examples below serve for further explanation of the invention.

Construction adhesive formulations were tested; the comparative example here used a premixed dry mortar formulation, and in the inventive example here the dispersion powder had been packed in water-soluble packaging made of polyvinyl alcohol before use.

COMPARATIVE EXAMPLE 1

A dry mortar was mixed from the following constituents:

| | |
|---|---|
| 300.0 g | of cement (OPC CEM I 42.5, Milke Zement GmbH&CoKG) |
| 687.5 g | of quartz sand (F31/F36 1:1 quartz sand, Quarzwerke GmbH) |
| 2.5 g | of cellulose ether (Tylose MB 3003 P4, Shin-Etsu SE) |
| 5.0 g | of calcium formate (Fluka GmbH) |
| 5.0 g | of Vinnapas 5010N dispersion powder (polyvinyl-alcohol-stabilized vinyl acetate-ethylene copolymer, Wacker Chemie AG) |

A mortar was produced by mixing the dry mortar with 265 g of water.

INVENTIVE EXAMPLE 2

An additive pack with a capsule made of cold-water-soluble polyvinyl alcohol (90 mm×125 mm pouch, thickness 35 μm, weight 0.1 g) from the company gs-go soluble and Vinnapas® 5010N dispersion powder (4.9 g) from the company Wacker Chemie AG therein were dissolved in 265 g of water.

The other constituents of the mortar were then added to this aqueous solution, and the mortar was mixed:

| | |
|---|---|
| 300.0 g | of cement (OPC CEM I 42.5, Milke Zement GmbH&CoKG) |
| 687.5 g | of quartz sand (F31/F36 1:1 quartz sand, Quarzwerke GmbH) |
| 2.5 g | of cellulose ether (Tylose MB 3003 P4, Shin-Etsu SE) |
| 5.0 g | of calcium formate (Fluka GmbH) |

The tensile bond strength values (TBS) were determined for the adhesive mortars of comparative example 1 and inventive example 2 by a method based on DIN EN 1348.

For the test, the adhesive mortars from comparative example 1 and inventive example 2 were applied with a 6 mm notched trowel to concrete paving slabs. Five ceramic tiles (5 cm×5 cm) where then in each case placed into the mortar bed and were in each case loaded for a period of 30 seconds with a 2 kg weight. 27 days after the mortar had hardened, epoxy resin adhesive was used to attach metal tension anchors to the tiles.

The test samples were then stored for seven days under standard climatic conditions (23° C. and 50% relative humidity) or 14 days under standard climatic conditions.

After expiry of the storage period, tension equipment from the company Herion was used with a load increase rate of 250 N/s to determine the respective tensile bond strength values. The measured values in N/mm² represent average values from five measurements (table 1).

TABLE 1

| Storage period | Comp. ex. 1 (N/mm$^2$) | Inv. ex. 2 (N/mm$^2$) |
|---|---|---|
| 7 days under standard climatic conditions | 0.51 | 0.51 |
| 14 days under standard climatic conditions | 0.56 | 0.60 |

Surprisingly, it was found that when the additive pack of the invention was used to add the dispersion powder there was no resultant loss of quality in comparison with adhesive mortars derived from conventional dry mortar formulations.

Indeed, slightly better bond strengths were obtained with the additive pack of the invention (see values after storage period of 14 days).

It is clear that the packaging material is a functional constituent of the mortar formulation and has no adverse effects on the mortar formulation, but instead can actually improve the properties of the formulation. The additive pack of the invention is therefore a valuable aid to the production of high-specification mortars when factory-produced dry mortars are not available. Unlike conventional packaging materials made of paper and plastic, the additive pack of the invention improves the quality of the mortar and because the packaging is soluble in water, which is a constituent of the mortar formulation, eliminating packaging waste.

What is claimed is:

1. An additive pack which comprises a water-soluble capsule and a water-dispersible polymer powder contained therein wherein, the water-soluble capsule comprises a partially hydrolyzed vinyl acetate homopolymers or partially hydrolyzed vinyl acetate copolymer, each with a degree of hydrolysis of from 70 to 95 mol %, and a Höppler viscosity of from 1 to 50 mPas, or a mixture thereof.

2. The additive pack of claim 1, wherein the partially hydrolyzed vinyl acetate copolymers comprise copolymers of vinyl acetate with 1 to 50% by weight of one or more comonomers selected from the group consisting of ethylenically unsaturated carboxylic acids and 1-alkylvinyl acetates having $C_1$- to $C_4$-alkyl groups.

3. The additive pack of claim 2, wherein the partially hydrolyzed vinyl acetate copolymers comprise copolymers of from 80 to 95% by weight of vinyl acetate, from 5 to 20% by weight of isopropenyl acetate, and from 0 to 5% by weight of other ethylenically unsaturated copolymerizable monomers, where the total of the percents by weight is 100%, and the copolymers have a degree of hydrolysis of from 80 to 90 mol % and a Höppler viscosity of from 5 to 30 mPas.

4. The additive pack of claim 1, wherein the water-dispersible polymer powders comprise polymers of one or more vinyl esters of unbranched or branched carboxylic acids having from 1 to 12 C atoms, acrylic esters or methacrylic esters of unbranched or branched alcohols having from 1 to 15 C atoms, vinyl aromatics, olefins, 1,3-dienes, and/or vinyl chloride.

5. The additive pack of claim 4, wherein at least one water-dispersible polymer powder is selected from the group consisting of:

copolymers of vinyl acetate and from 5 to 50% by weight of ethylene;

copolymers of vinyl acetate, from 1 to 50% by weight of ethylene, and from 1 to 50% by weight of vinyl ester of α-branched monocarboxylic acids having from 9 to 12 C atoms;

copolymers of from 30 to 75% by weight of vinyl acetate, from 1 to 30% by weight of vinyl laurate or vinyl ester of an alpha-branched carboxylic acid having from 9 to 12 C atoms, and also from 1 to 30% by weight of (meth)acrylic ester of unbranched or branched alcohols having from 1 to 15 C atoms, where these also comprise from 1 to 40% by weight of ethylene;

copolymers of vinyl acetate, from 1 to 25% by weight of ethylene, and from 15 to 35% by weight of vinyl chloride;

copolymers of styrene and from 20 to 50% by weight of 1,3-butadiene; and copolymers of styrene and from 20 to 50% by weight of methyl acrylate, ethyl acrylate, propyl acrylate, butyl acrylate, or 2-ethylhexyl acrylate;

where the polymers or copolymers optionally further comprise ancillary monomers, and the total of the percents by weight is 100%.

6. The additive pack of claim 1, wherein, in addition to the water-dispersible polymer powder, one or more other additives selected from the group consisting of mineral binders, fillers, thickeners, setting retarders, setting accelerators, defoamers, and hydrophobizing agents, is/are present.

7. The additive pack of claim 6, wherein, in addition to the water-dispersible polymer powder, one or more thickeners selected from the group consisting of polysaccharides, phylosilicates, or polycarboxylic acids, is/are present.

8. The additive pack of claim 1, which further comprises a dry mortar mix.

9. The additive pack of claim 6, which comprises from 50 to 95% by weight of water-dispersible polymer powder and from 5 to 50% by weight of one or more other additives, based on the total weight of the additives.

10. In the production of aqueous mortars with mineral binders, the improvement comprising supplying a water-dispersible polymer in an additive pack of claim 1.

11. An aqueous mortar composition containing a mineral binder, obtained by means of addition of a quantity of from 1 to 10% by weight, based on the dry weight of the mineral binder, of one or more additive packs of claim 1.

12. The additive pack of claim 6, wherein in addition to the water-dispersible polymer powder, one or more cellulose ether or starch ether thickeners is/are present.

* * * * *